United States Patent Office 3,347,830
Patented Oct. 17, 1967

3,347,830
PROCESS OF POLYMERIZING FORMALDEHYDE
Nobuyuki Nakajima, Pompton Lakes, N.J., assignor to W. R. Grace & Co., New York, N.Y., a corporation of Connecticut
No Drawing. Filed July 30, 1964, Ser. No. 386,423
14 Claims. (Cl. 260—67)

This invention relates to a process, in particular, a novel process for producing esterified, thermally stable, high molecular weight polyoxymethylene.

In recent years, there have been described many various processes for preparing high molecular weight polyoxymethylene having improved thermal stability. In all presently known processes, two separate and distinct procedures are involved in preparing these polymers. The first of these procedures is the polymerization itself, and the second is a subsequent separate chemical modification of the recovered polymer.

In conventional polymerization procedures, formaldehyde monomer is polymerized in a liquid reaction medium containing a suitable polymerization catalyst. The liquid medium must be one which is inert to the formaldehyde monomer, to the catalyst, and to the polymerized product. Exemplary reaction media used in the known procedures include aliphatic, cyclo-aliphatic and aromatic hydrocarbons, hydrocarbon halides, etc.; such as, for example, propane, butane, pentane, hexane, heptane, cyclohexane, benzene, toluene, xylene and the like. The solid polymer particles produced are recovered in suitable fashion from the polymerization mixture. These must, in the conventional procedures, be washed (with, for example, diethyl ether) to remove reaction byproduct impurities and occluded catalyst, after which the polymer is dried.

The known procedures for chemical modification of polyoxymethylene to improve its thermal stability involve reacting the polymer with the anhydride of a saturated monocarboxylic acid, usually in the presence of a catalyst such as pyridine or like tertiary amine. While the chemical modification reaction can be accomplished in other ways (by vapor-phase reaction, for example) the overwhelming preference is to conduct this reaction in an excess of the anhydride as a reaction medium.

Thus, in the great majority of the known procedures, countervailing criteria apply. On the one hand, an inert medium is required for the polymerization reaction, while on the other hand, the chemical modification is most generally conducted in an excess of the modifying agent as the reaction medium. Furthermore, different and entirely distinct classes of catalysts are used in each of the two known procedures. As a consequence, an intermediate polymer purification step is necessitated in all of the known procedures.

It is an object of this invention to provide a new and improved process for making thermally stable, high molecular weight polyoxymethylene.

Another object of this invention is to provide a new and improved integrated process for producing and chemically modifying polyoxymethylene, in which process no intermediate polymer purification step is required.

Still another object of this invention is to provide a new and improved process for producing and chemically modifying polyoxymethylene, in which process the addition of a single material provides catalysts for both of the reactions, that is, the polymerization reaction and the chemical modification reaction.

Still further objects and the many advantages of the present invention will become apparent to those skilled in the art in view of the following more detailed description thereof.

It has surprisingly been found that the above enumerated and other objectives can be accomplished by (a) polymerizing substantially anhydrous monomeric formaldehyde to a particulate high molecular weight, solid polymer in a reaction medium consisting essentially of (1) the anhydride of a saturated monocarboxylic acid and (2) a catalytic amount of an alcoholate of a metal having a valence not greater than 3, while maintaining said medium at temperatures in the range of from about $-50°$ to about $+40°$ centigrade; (b) separating the polymer from the reaction medium; (c) forming a mixture consisting essentially of the said polymer with sufficient amounts of an anhydride of a saturated monocarboxylic acid to provide at least about 1.5 parts of said anhydride per part of said polymer; (d) heating the said mixture to a temperature of from about 80° centigrade to about the boiling point thereof for a period of time sufficient to substantially completely esterify the terminal hydroxyl groups of said polymer; and (e) recovering the said substantially completely esterified polymer.

The formaldehyde monomer used in the present invention may be derived from any suitable source. Suitable sources include paraformaldehyde, alpha-polyoxymethylene, formaldehyde solutions and the like. The formaldehyde monomer should be substantially anhydrous so that high molecular weight polymers may be made therefrom. The term "substantially anhydrous" as used herein is intended to mean formaldehyde monomer containing less than about 0.5 percent, and preferably less than about 0.1 percent by weight of water. A final purification of the gaseous formaldehyde monomer may be obtained by passing the monomer through one or more cold traps held at temperatures of about 0° centigrade or so, just prior to introducing the monomer into the polymerization reaction medium. The cold traps may be in the form of empty U-tubes, liquid hydrocarbon through which the formaldehyde is bubbled, or in any other form familiar to skilled chemists.

In general, any anhydride of a saturated, monocarboxylic acid is suitable for the practice of this invention. The same anhydrides or different anhydrides may be used in the polymerization and esterification steps, as desired. Most especially preferred anhydrides are the anhydrides of saturated aliphatic monocarboxylic acids containing from 1 to about 10 carbon atoms. The monocarboxylic acid may be substituted by inert groups such as alkoxy radicals or halogen atoms. Included among the anhydrides which may be employed for the practice of the present invention are the anhydrides of the aliphatic monocarboxylic acids, such as acetic, propionic, butyric, caproic, decanoic or stearic acid; of cycloaliphatic monocarboxylic acids, such as cyclohexane-monocarboxylic acid; of aromatic monocarboxylic acids, such as benzoic acid; and the mixed anhydrides of any two of the above acids, such as acetic propionic anhydride. The most especially preferred anhydride for both the polymerization and esterification step is acetic anhydride because of its wide availability and low cost.

It is preferable that the anhydride used in the process be of reasonably high purity in order that optimum results may be obtained. It is well-known to those skilled in the art that acetic anhydride usually contains some traces of acetic acid, and may contain large quantities of acetic acid if the anhydride has been exposed to the moisture of the atmosphere for some time. Similar considerations apply to the other anhydrides useful in this invention, and their corresponding acids. Best results are obtained in the practice of the invention when the saturated monocarboxylic acid anhydride contains less than about 1 percent by weight of the corresponding free acid. Larger amounts of free acid in the polymerization reaction medium causes undesirable general reduction in the molecular weight of the polymer formed. Increasing concentration of free acid in the esterification reaction cause polymer degradation. The net effect is undesirably lower product yields and poorer thermal stability of the product. Any free acid in the anhydride can usually be removed by simple distillation of the anhydride prior to use in the process. In a continuous process, any by-product free acid can be readily removed from the reaction medium by distillation prior to recycling the medium for further use.

The alcoholates used in the practice of the present invention are most readily identified or defined as those having the general formula:

$$(RO)_nM$$

Where

R is alkyl, aralkyl, cycloalkyl, aryl or alkaryl;
$n$ is an integer of from 1 to 3, equal to the valence of M; and
M is a metal from group 1A, 1B, 2A, 2B or 3A of the Periodic Table of Elements, exclusive of the element boron.

The Periodic Table used for the purposes of this invention is that appearing in Lange's Handbook of Chemistry, 7th edition, 1949, at pages 58 and 59.

Illustrative of suitable alkyl and aralkyl radicals represented by R are methyl, ethyl, propyl, butyl, isobutyl, hexyl, isohexyl, 3-propylheptyl, dodecyl, octadecyl, 2-phenylpropyl or the like. Illustrative cycloalkyl radicals are cyclopentyl, cyclohexyl, cycloheptyl, 2-methylcyclohexyl, cyclooctyl or the like. Illustrative aryl and alkaryl radicals are phenyl, benzyl, tolyl, ethylphenyl, butylphenyl or the like.

Illustrative of specific alcoholates useful in the practice of the present invention are the following: The methoxides, ethoxides, propoxides, isopropoxides, butoxides, isobutoxides, tert-butoxides, hexoxides, octoxides, decoxides, octadecoxides, cyclohexoxides, cyclooctoxides, benzoxides, phenoxides, toloxides, or ethylphenoxides of lithium, sodium, potassium, rubidium, cesium, copper, silver or gold; the diethoxides, dimethoxides, dipropoxides, diisopropoxides, dibutoxides, diisobutoxides, di(tert-butoxides), dihexoxides, diheptoxides, didecoxides, didodecoxides, dihexadecoxides, dioctadecoxides, di(phenylethoxides), di(2-phenylpropoxides), dicyclohexoxides, dicycloheptoxides, diphenoxides, or di(ethylphenoxides) of beryllium, magnesium, calcium, strontium, barium, copper, zinc, cadmium or mercury; or the mixed alkoxy and/or aralkoxides and/or cycloalkoxy and/or aryloxy and/or alkaryloxy compounds of these last-named metals such as, for example, methoxy, ethoxy, magnesium, cyclohexoxy, isopropoxy, zinc, dodecoxy, phenoxy, calcium, or the like; the trimethoxides, triethoxides, tripropoxides, triisopropoxides, tributoxides, triisobutoxides, tri(tert-butoxides), trihexoxides, trinonoxides, tripentadecoxides, tricyclohexoxides, tricyclopentoxides, tribenzoxides, triphenoxides, tri(ethylphenoxides), tri(phenylethoxides), or tri(butylphenoxides) of aluminum, gallium, indium, or thallium; or the mixed alkoxy and/or aralkoxy and/or cycloalkoxy and/or aryloxy and/or alkaryloxy compounds of these last-named metals such as, for example, diethoxy methoxy aluminum, phenoxy dicyclohexoxy aluminum, ethylphenoxy cyclohexoxy phenylpropoxy aluminum or the like.

The preferred alcoholates are the aluminum alcoholates, most preferable the trialkoxides of aluminum wherein the alkyl radical contains from 1 to about 6 carbon atoms.

The polymerization conditions are well known to those skilled in the art so that detailed description herein is not necessary. In general, it can be said that neither the temperature nor the pressure during polymerization is particularly critical. Temperatures may range, for example, from about —50° to about +40°, preferably about 0 to about 25° centigrade. Room temperature is usually quite suitable and will usually be most especially preferred. Superatmospheric or subatmospheric pressures may be used as desired. However, since the polymerization proceeds quite well at atmospheric pressure, this will usually be the preferred pressure. The proportions of the various raw materials are not critical. The weight ratio of anhydride reaction medium to formaldehyde may vary from about 1 to 500 or more, depending solely upon the thickness desired in the slurry formed. Assuming substantially complete conversion of the formaldehyde to solid, high molecular weight polymer it will usually be preferred to use about 3 to about 50 parts by weight of reaction medium per part by weight of formaldehyde monomer. The amount of metal alcoholate in the reaction medium may vary from trace amounts (e.g., about 0.001 part per part by weight of anhydride) up to 10 parts or more per part by weight of anhydride. The upper limit for the alcoholate concentration is dictated solely by economic considerations. Usually, amounts ranging from about .01 to about 1.0 part of alcoholate per part by weight of anhydride will be preferred. The alcoholate may be added to the anhydride reaction medium prior to introducing any formaldehyde gas therein, or the medium may first be saturated with formaldehyde before the alcoholate is added. For ease and convenience, the alcoholate will usually be added to the medium before any formaldehyde is introduced.

A brief induction period occurs upon commencing introduction of the substantially anhydrous formaldehyde into the anhydride-alcoholate reaction medium. During this brief period, the gas introduced dissolves in the anhydride until the anhydride becomes saturated. Thereafter, particles of solid, high molecular weight polymer begin to form. These particles are maintained in suspension in the medium by the agitating action of the gas bubbling therethrough, usually together with the action of suitable stirring devices. When polymerization is completed, the agitation is usually ceased and the particles quickly settle out of the medium.

The polymer formed has a number average molecular weight greater than about 15,000. In almost every instance polymers produced by the process of this invention have a number average molecular weight greater than 40,000 and, in the majority of cases, the polymers have a molecular weight of 100,000 to 200,000 or more.

After the introduction of formaldehyde monomer is discontinued, the polymer particles are separated from the polymerization reaction medium in any suitable manner; e.g., by filtering, centrifuging, decanting, etc.; after which the separated (but otherwise untreated) polymer is mixed with further amounts of fresh monocarboxylic acid anhydride. Unreacted formaldehyde monomer in the polymerization reaction medium can be recycled for further use in a subsequent polymerization step.

The mixture formed consists essentially of polymer and sufficient amounts of anhydride to provide at least 1.5 parts of the anhydride per part of polymer. No acylation catalyst is necessary or desirable in the process of the present invention. It is believed that metal acylate formed from the metal alcoholate is occluded in the polymer particles and carried therewith into the acylation step, where it serves as a catalyst for the acylation reaction. Thus, drying, washing and other usual purification steps required in the known prior art processes are totally eliminated in the process of the present invention.

The polyoxymethylene polymer is acylated by heating the mixture in a manner well-known to those skilled in the art, which need not be fully described herein. The temperature and pressure during the acylation reaction are not critical. If the temperature used is above the normal boiling point of the reaction mixture, pressure may be used to maintain the reaction medium in the liquid state. In general, temperatures of from about 80° centigrade to about the boiling point of the reaction mixture may be used. The time required for substantial completion of the esterification will vary in accordance with the temperature, concentration of reactants and other factors well-known to those skilled in the art. It is often advantageous to perform the acylation reaction under temperature and pressure conditions such that the reaction medium is in reflux. In the case of acetic anhydride, for example, this would involve reaction at a temperature of about 140° centigrade for atmospheric pressure. The proportional amounts of the ingredients are not particularly critical. For ease in handling, it is usually preferred to have at least about two parts by weight of anhydride for each part by weight of polymer being esterified. Higher polymer concentrations can be handled in some cases if more efficient stirring mechanisms are available. Most preferably, the anhydride is used in a large excess. In general, the anhydride may be used in amounts up to about 20 times or more the weight of the polymer. The upper limit on the amount of anhydride is based solely on economic considerations, and larger amounts may be used if desired for any particular situation.

The acylation reaction is continued for a time sufficient to substantially completely esterify the terminal hydroxyl groups in the polyoxymethylene polymer. By this, it is meant that at least about 95% of the hydroxyl groups appearing in the various polymer chains are fully esterified.

The acylated product recovered from the esterification reaction should, as known in the art, be washed and dried or otherwise suitably treated to remove reactants and by-products that might cause degradation of the esterified polymer. Acids or bases or any compounds capable of forming the same should be removed as thoroughly as possible from the esterified polymer. This is most conveniently accomplished by washing the polymer with water or an organic solvent (such as diethyl ether, acetone or the like) followed by drying the washed polymer in any suitable manner. The details of these final purification procedures are well-known in the art, so that no further description thereof herein is deemed necessary.

Various optional ingredients may be added to the esterified polymer during or after the final purification. Such materials may include, for example, pigments, dyes, antioxidants, stabilizers, fillers, plasticizers or the like.

The invention is further illustrated by the following specific, but non-limiting, examples. In the examples, the reduced viscosity of the products was determined as follows:

A 0.15 gram sample of polymer was added to 100 milliliters of gamma-butyrolactone in a suitable flask. The flask was then heated for 30 minutes in an oil bath at a temperature of about 135° centigrade with intermittent swirling to assure complete solution of the polymer in the lactone solvent. The viscosity of a 20 milliliter sample of the solution was then determined in a Ubbelohde viscometer at a temperature of 135° centigrade. The viscosity of gammabutyrolactone was determined in the same manner and at the same temperature. Reduced viscosity is then calculated by use of one equation:

$$RV = \frac{T_s - T_o}{cT_o}$$

Where:

$T_o$ is the efflux time for the solvent.
$T_s$ is the efflux time for the polymer solution, and
$c$ is the concentration of the polymer in the solution in grams per 100 milliliters.

Example I

In a polymerization vessel there was placed 100 milliliters of acetic anhydride which had been previously distilled to remove essentially all free acetic acid therefrom. Finely divided tri(tert-butoxy) aluminum (about one-tenth gram) was added to the vessel together with the acetic anhydride. A suitable amount of alpha-polyoxymethylene was placed in a separate vessel, which was connected via two cold traps and a safety trap to the polymerization vessel. The vessel containing the alpha-polyoxymethylene was heated with a hotplate to degrade the polymer and form gaseous formaldeyhde monomer. The monomer gas was fed through the cold traps, which were maintained at about −25° centigrade, to remove any traces of water present in the monomer gas. The moisture free gas was then passed through the safety trap (maintained at about 0° centigrade) and was bubbled into the acetic anhydride in the polymerization vessel. The temperature of the contents of the polymerization vessel was maintained at about room temperautre. The velocity of the formaldehyde gas was adjusted so that it was essentially completely dissolved in the anhydride for conversion into polymer. After a short period of time, during which the anhydride became saturated with monomer, high molecular weight, fine white particles of polyoxymethylene began to form in the reaction medium. After about 11 parts by weight (approximately one-tenth the weight of the anhydride reaction medium) of formaldehyde gas had been introduced into the anhydride and polymerized the introduction of formaldehyde gas into the polymerization vessel was discontinued. The polymer particles quickly settled out of the anhydride. The polymer particles were filtered from the polymerization reaction medium and mixed in a separate vessel with about 100 milliliters of acetic anhydride, which had been distilled to remove essentially all free acetic acid therefrom. No other materials were added to this vessel. The materials were then heated to about 140° centigrade and refluxed for about one hour, after which time the acetylation of the polyoxymethylene was essentially complete. The acetylated polymer was filtered from the acetic anhydride and washed with acetone to remove any occluded anhydride. Sufficient amounts of a suitable antioxidant (e.g., di-beta-naphthyl-para-phenylene diamine) were added to the acetone to provide about 1 percent by weight thereof in the final polymer product. The polymer containing the antioxidant was then dried in a vacuum oven for one hour at room temperature.

The acetylated polyoxymethylene recovered in this example had a melting point of about 174° centigrade and a reduced viscosity of 1.0. It was easily hot pressed into smooth, tough, thermally stable films.

Example II

The materials and procedures in this example were essentially the same as those described in Example I. However, in this example, a highly crystalline high molecular weight polyoxymethylene was pyrolyzed to form the formaldehyde monomer.

The acetylated product had a melting point of 180° centigrade and a reduced viscosity of 1.5. It was readily hot-pressed into smooth, tough, thermally stable films.

Examples III–VII

In these examples, the procedures were the same as that described in Example II. The materials used were also the same, except for the substitution of various metal alcoholates for the tri(tert-butoxy) aluminum used in Example II. The following table shows the specific alcoholates used in each of the respective examples:

| Example No: | Alcoholates |
| --- | --- |
| III | Trimethoxy aluminum. |
| IV | Triethoxy aluminum. |
| V | Triisopropoxy aluminum. |
| VI | Decoxy sodium. |
| VII | Diethoxy magnesium. |

Each of the products recovered in the foregoing Examples III through VII had properties essentially the same as those of the product recovered in Example II.

All of the products made in accordance with this invention are useful in, for example, the preparation of films, fibres, filaments and other like articles of manufacture.

What is claimed is:
1. Process comprising:
(a) polymerizing substantially anhydrous monomeric formaldehyde to a high molecular weight, solid polyoxymethylene polymer in a reaction medium consisting essentially of (1) an anhydride of a saturated monocarboxylic acid and (2) a catalytic amount of a metal alcoholate having the general formula

$$(RO)_nM$$

Where:
R represents radicals selected from the group consisting of alkyl, cycloalkyl, aryl, aralkyl and alkaryl:
$n$ is an integer of from one to three corresponding to the valence of M; and
M is a metal selected from the metals in Groups 1A, 1B, 2A, 2B and 3A of the Periodic Table of elements,
while maintaining said reaction medium at temperatures in the range of from about $-50°$ to about $40°$ centigrade:
(b) separating the polymer from the reaction medium;
(c) forming a mixture consisting essentially of the said separated polymer and sufficient amounts of an anhydride of a saturated monocarboxylic acid to provide at least about 1.5 parts by weight of said anhydride per part by weight of said polymer;
(d) heating the said mixture to temperatures in the range of from about $80°$ centigrade to the boiling point thereof for a period of time sufficient to substantially completely esterify the terminal hydroxyl groups of said polymer; and
(e) recovering the said esterified polymer.

2. Process as defined in claim 1, wherein the polymer separated in step (b) has a number average molecular weight greater than about 15,000.

3. Process as defined in claim 1, wherein the anhydride in step (a) and step (c) is acetic anhydride.

4. Process as defined in claim 1, wherein the metal alcoholate is an aluminum alcoholate.

5. Process of claim 4, wherein said aluminum alcoholate is trimethoxy aluminum.

6. Process of claim 4, wherein said aluminum alcoholate is triethoxy aluminum.

7. Process of claim 4, wherein said aluminum alcoholate is triisopropoxy aluminum.

8. Process of claim 4, wherein said aluminum alcoholate is tri(tert-butoxy) aluminum.

9. Process of claim 1, wherein the temperature in step (a) is in the range of from about $0°$ to about $25°$ centigrade.

10. Process of claim 1, wherein the temperature in step (c) is the reflux temperature of the reacting mixture.

11. Process of claim 1, wherein the formaldehyde monomer is formed from paraformaldehyde.

12. Process of claim 1, wherein the formaldehyde monomer is formed from alpha polyoxymethylene.

13. Process of claim 1, wherein the formaldehyde monomer is formed from high molecular weight crystalline polyoxymethylene.

14. Process comprising:
(a) polymerizing substantially anhydrous monomeric formaldehyde to a high molecular weight, solid polyoxymethylene polymer in a reaction medium consisting essentially of (1) acetic anhydride and (2) a catalytic amount of an aluminum alcoholate having the general formula $$(RO)_3Al$$

wherein:
R is an alkyl radical containing from 1 to about 6 carbon atoms,
while maintaining said reaction medium at temperatures in the range of from about $0°$ centigrade to about room temperature:
(b) separating the polymer from the reaction medium;
(c) forming a mixture consisting essentially of said separated polymer and sufficient amounts of acetic anhydride to provide at least about 1.5 parts by weight of anhydride per part by weight of polymer;
(d) heating the said mixture to the reflux temperature thereof, and refluxing for a period of time sufficient to substantially completely acetylate the terminal hydroxyl groups of said polymer;
(e) recovering the said acetylated polymer.

References Cited
UNITED STATES PATENTS

| 2,848,437 | 8/1958 | Langsdorf, et al. | 260—67 |
| 3,135,718 | 6/1964 | Wagner et al. | 260—67 |
| 3,219,630 | 11/1965 | Sidi | 260—67 |

WILLIAM H. SHORT, *Primary Examiner.*

L. M. PHYNES, *Assistant Examiner.*